United States Patent [19]

Douhet et al.

[11] Patent Number: 4,953,055
[45] Date of Patent: Aug. 28, 1990

[54] SYSTEM AND A PROTECTION AND REMOTE POWER-FEEDING DEVICE FOR EQUIPMENT CONNECTED BY TWO TRANSFORMERS TO A FOUR-WIRE TRANSMISSION LINK

[75] Inventors: Gérard Douhet, Strasbourg; Yves Daviaud, Fegersheim, both of France

[73] Assignee: Societe Anonyme dite : Telic Alcatel, Paris, France

[21] Appl. No.: 242,453

[22] Filed: Sep. 9, 1988

[30] Foreign Application Priority Data

Sep. 9, 1987 [FR] France .................. 87 12511

[51] Int. Cl.$^5$ .............................................. H02H 1/00
[52] U.S. Cl. ...................................... 361/62; 361/119; 379/250; 379/412
[58] Field of Search ............ 361/62, 35, 38, 250, 361/119; 379/412, 413, 324

[56] References Cited

U.S. PATENT DOCUMENTS

| 3,673,335 | 6/1972 | Joel, Jr. .................. | 379/250 |
| 4,480,152 | 10/1984 | Cardot et al. ............ | 379/412 |
| 4,837,671 | 6/1989 | Wild et al. ............... | 361/62 |

FOREIGN PATENT DOCUMENTS 2517908  6/1983  France .

OTHER PUBLICATIONS

"Integrated Services Digital Network Interfaces", Section 3 of CCITT Bluebook, pp. 171-212, no date.
"A Monolothic Digital Line Interface Circuit", published at 1980 ISSCC.

Primary Examiner—A. D. Pellinen
Assistant Examiner—Jeffrey A. Gaffin
Attorney, Agent, or Firm—Sughrue, Mion, Zinn, Macpeak & Seas

[57] ABSTRACT

A remote power-feeding and protection system for equipment connected by two transformers to a four-wire transmission link.

The remote power-feeding and protection system and the remote power-feeding extractor protection device are intended for equipment connected by two transformers to a transmission link with two pairs of wires ensuring remote power-feeding of the fed equipment.

Each transformer is connected to the two wires of one pair by two identical windings serially-connected between these two wires through a capacitor. The two pairs of wires constitute a phantom feed circuit, the two wires of a given pair being connected to the same terminal of a D.C. generator. The extraction and protection device comprises two rectifier bridges each separately connected by their inputs to a pair of wires and interconnected by their outputs in order to provide remote power feeding.

3 Claims, 1 Drawing Sheet

U.S. Patent
Aug. 28, 1990
4,953,055
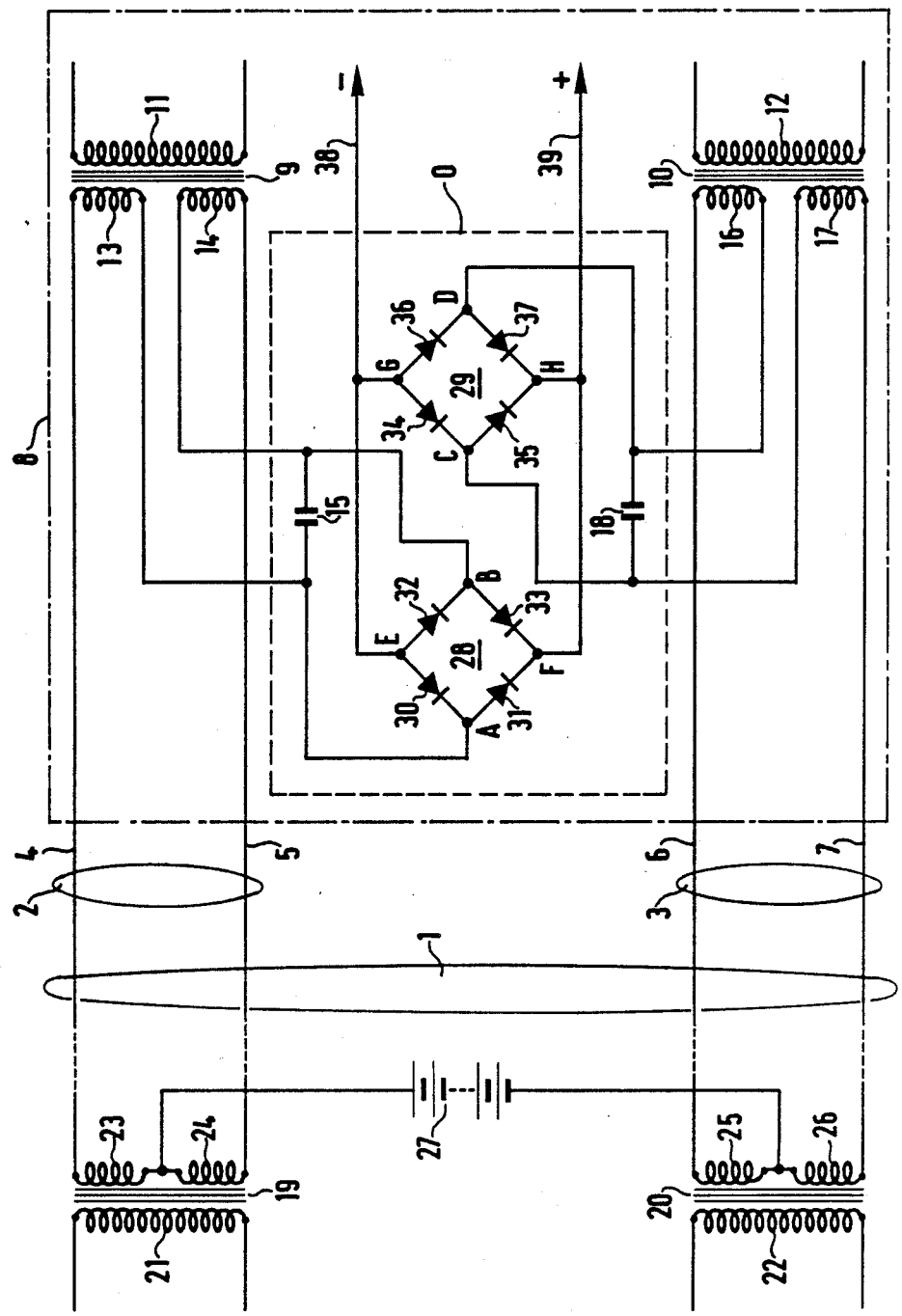

SYSTEM AND A PROTECTION AND REMOTE POWER-FEEDING DEVICE FOR EQUIPMENT CONNECTED BY TWO TRANSFORMERS TO A FOUR-WIRE TRANSMISSION LINK

BACKGROUND OF THE INVENTION

The invention relates to a remote power feeding and protection system and a remote power feeding extractor protection device for equipment connected by two transformers to a four-wire transmission link ensuring remote power-feeding.

It particularly concerns remote power-fed equipment provided with a pulse transmission transformer and a pulse receiving transformer which are each respectively connected to one of the two pairs of wires of a four-wire transmission link by which the equipment in question is also partially or entirely D.C. remote power-fed. This applies, for example, as regards linking equipment between terminals—or terminal adaptors—and private unit automatic exchanges—or local networks—which are defined as S-interface equipment in the networks integrating telephony and data currently designated by the latter symbols.

It is normal practice in telephony to provide line equipment of electronic networks, both temporal and spatial, with translators enabling continuity of the link to be interrupted between a two-wire transmission and feed line and the switching exchange for direct-currents, whilst ensuring the passage of currents at voice frequencies. Normally, such translators comprise a transformer with two windings, known as primary windings, and one winding, known as a secondary winding, to which associated a capacitor inserted between is two primary windings.

The capacitor constitutes a short-circuit for voice frequencies transmitted, either from the two serial primary windings towards the secondary winding, or inversely.

On the other hand, this capacitor prohibits the flow of the D.C. power-feed current which the line supplies as regards the two primary winding. A remote power-feeding extraction arrangement makes it possible to selectively pick up the direct current which the line supplies for the requirements of the equipment fed by this line.

The capacitor and the two primary windings of the transformer operate with continuous polarizations much greater than the amplitudes of voice frequency signals, which is unsuitable for transmission of the latter.

The volume of the primary windings has to be substantial owing to the low resistance admissible for these windings and the high continuous polarization of the magnetic circuit.

It is an additional common practice to place on the line current limiting resistors which are often associated with resistors with a positive temperature coefficient so as to limit the direct currents to reasonable values.

Such arrangements provided for voice frequency signals are no longer acceptable for the transmission of data in a pulse form with rates capable, for example, of reaching 96 Kbit/s.

It is therefore vital to eliminate line resistors. To compensate for the elimination of these resistors, it is then necessary to dispose of a protection device making it possible to avoid heating the transformers and restrict interference for the equipment fed by this transformer in the even of a short-circuit or inversion of wires, or in the even of injecting low-range industrial voltages.

Moreover, it is sought to provide links which allow for simultaneous bidirectional transmissions, which accordingly involves one pair of wires per channel and one transformer per pair of wires in the equipment in question.

OBJECT AND SUMMARY OF THE INVENTION

Accordingly, the present invention relates to a protection and remote power feeding system for equipment connected by two transformers to one extremity, known as the fed extremity, of a transmission link with two pairs of wires also ensuring the remote power feeding of the equipment from its other extremity, known as the feeding extremity. Each transformer is individually connected, firstly to the two wires of one pair by means of two identical windings serially-connected between these two wires through a capacitor, known as an intermediate capacitor, situated between these two windings at the link power fed extremity, and secondly by at least one winding to the fed equipment.

According to one feature of the invention, the system comprises a remote power feeding direct current voltage source whose two terminals are each individually connected to the two wires of one of the pairs at the power feeding extremity of the link, and a remote power feeding extractor protection device comprising two rectifier bridges, firstly each individually connected by two inputs to the terminals of one of the two intermediate capacitors between the windings connected to this capacitor at the power fed extremity of the link, and secondly in parallel by their outputs where remote power feeding is recovered.

The present invention also relates to a remote power feeding extraction protection device for equipment connected by two transformers to one extremity, namely the fed extremity, of a transmission link with two pairs of wires also ensuring remote power-feeding of the equipment from its other extremity, namely the power feeding extremity, by a direct current voltage applied between the two pairs of wires, each transformer being individually connected firstly to the wires of one pair by means of two identical windings serially-connected between these two wires through a capacitor, known as the intermediate capacitor, situated between these two windings at the power-fed extremity of the link, and secondly by at least one winding to the fed equipment.

According to one feature of the invention, this remote power feeding extractor protection device comprises two rectifier bridges, each individually connected by two inputs to the terminals of one of the two intermediate capacitors between the windings connected to this capacitor at the power fed extremity of the link, and secondly in parallel by their outputs where remote power feeding of the equipment is recovered.

BRIEF DESCRIPTION OF THE DRAWINGS

The invention, its features and its advantages are stated in the following description in conjunction with the single FIGURE defined hereafter.

This FIGURE illustrates a diagram of a protection and remote power-feeding system comprising a remote power-feeding extractor device according to the invention.

The protection and remote power feeding system illustrated in the aforesaid figure is intended to be associated with a transmission link 1—with two pairs 2, 3, of wires 4, 5 and 6, 7—provided so as to allow for a bi-directional transmission of data and/or speech signals, particularly when these signals are constitutted in the form of sequences of coded pulses.

The transmission link 1 usually feeds used equipment 8 not specified herein, such as a ISDN terminal network, or an adaptor for such a terminal provided with an S-interface circuit according to Telephone and Telegraph International Consultative Committee (CCITT) standards. This user equipment 8 is connected by two transformers 9 and 10 to the transmission link 1. The two transformers 9 and 10 more often ensure reverse-way transmissions and usually function with one transformer, for example 9, as the transmitter and the other as the receiver.

For this purpose, each comprises as winding connected inside the equipment (in a manner not shown here), such as the winding 11 for the transformer 9 and the winding 12 for the transformer 10.

Each of the transformers 9 or 10 is individually connected to a pair of wires of the link 1 by two identical windings serially connected through the capacitor, known as an intermediate capacitor, such as the identical windings 13 and 14 serially connected between the wires 4 and 5 of the pair 2 through the intermediate capacitor 15 inserted between these windings 13, 14 or the windings 16 and 17 serially connected between the wires 6 and 7 of the pair 3 through the intermediate capacitor 18.

The transformers 9 and 10 herein are transformers capable of transmitting pulses within the scope of a high-rate bi-directional transmission in the two-way transmission, and are thus connected by the link 1 to arrangements which are complementary to them and shown here in the form of two transformers 19 and 20.

One winding of each of the transformers 19 and 20 is connected in a manner not illustrated herein to the devices of an arrangement, which in the case of an ISDN network belongs to a unit automatic exchange, such as the winding 21 for the transformer 19 and the winding 22 for the transformer 20.

In the embodiment proposed, each of the transformers 19, 20 also comprises two identical windings serially connected between the wires of one of the two pairs of the link 1, such as the windings 23 and 24 between the wires 4 and 5 and the windings 25 and 26 between wires 6 and 7.

A D.C. generator 27 makes it possible to remote power-feed the equipment 8 situated at one extremity, namely the fed extremity, of the link 1 from the other extremity, namely the feeding extremity, of this link 1.

According to one preferred form of embodiment, the equipment 8 is power-fed by a phantom circuit associating comprising the two pairs of wires of the link 1 and the direct current generator 27 applies a positive polarity to the two wires of one pair, namely pair 2, and a negative polarity to the two wires of the other pair, namely pair 3.

Such a solution has the advantage of not creating a loop D.C. flow through the transformer windings connected to the wires of a given pair and to divide by two the D.C. capacity passing into each of the two wires operated in parallel of each pair.

A remote power-feeding extractor protection device 0 is placed at the power-fed extremity of the link 1 and mainly comprises two rectifier bridges 28, 29.

The two rectifier bridges 28 and 29 have their inputs A, B or C respectively connected, namely with one to the terminals of the capacitor 15 and the other to the terminals of the capacitor 18, whilst their outputs E, F of G, H are connected in parallel to the wires 38, 39 of the remote power-feeding supplying the equipment.

In this case, the rectifier bridges 28 and 29 are bridges with four diodes 30, 31, 32, 33 for one bridge and 34, 35, 36, 37 for the other bridge. The points A and B, one being common to the cathode of the diode 30 and to the anode of the diode 31, the other being common to the cathode of the diode 32 and the anode of the diode 33, are connected in parallel to the positive terminal of the D.C. generator 27 by the wires 4, 5.

Similarly, the points C and D, one being common to the cathode of the diode 34 and to the anode of the diode 35, the other being common to the cathode of the diode 36 and the anode of the diode 37, are connected in parallel to the negatiove terminal of the D.C. generator 27 by the wires 6, 7.

The remote power-feeding voltage is recovered by the wires 38, 39, one being connected respectively to the therminals E and F common to the cathodes of the diodes 30, 32 and 34, 36 and the other being connected to the terminals G and H respectively common to the anodes of the diodes 31, 33 and 35, 37.

The remote power-feeding and protection system has the advantage of allowing for the use of the transformers 9, 10 reduced in size and/or functioning at temperatures lower than those used with former techniques due to the embodiment of the phantom feed circuit, as mentioned earlier.

Twin-bridge mounting allows for reversal of the feeding polarities of the D.C. generator 27, without undermining the running of the system. It also makes it possible to safely bear any possible short-circuits and accidental looping between the wires of the link 1, the consequences for the transformers 9 and 10 being negligible to the extent that the D.C. voltages applied remain below the limits accepted by the intermediate capacitors which then protect the transformer windings connected to them.

Similarly, the application for low-range industrial alternating voltages remains insignificant once the intermediate capacitors are selected with high capacity and substantial dielectric strength, for example 2.2 microfarads and one hundred a.c. volts.

What is claimed is:

1. A remote power-feeding and protection system for equipment connected by first and second transformers to to a first end of a transmission link, said transmission link comprising two pairs of wires also providing the remote feeding of power to said equipment from a second end of said transmission link, each said transformer being individually connected to a respective one of said pairs of wires at said first end of said transmission link by first and second coupling means each comprising two identical windings serially connected between the two wires of a respective pair through a capacitor situated between the two windings, and each transformer being also connected by means of at least one winding to said equipment, wherein said remote power feeding and protection system comprises:

a remote power-feeding D.C. generator having a first terminal connected to the two wires of one of the pairs at said second end of the link and a second terminal connected to the two wires of the other of said pairs at said second end of said link, and a remote power-feeding extractor protection device comprising first and second rectifier bridges, said first rectifier bridge having two inputs connected to the terminals of the capacitor of said first coupling means and said second rectifier bridge having two inputs connected to the terminals of the capacitor of said second coupling means, and said first and second bridge rectifiers having their output terminals connected in parallel for supplying power to said equipment.

2. A remote power feeding extractor protection device for equipment connected by first and second transformers to one end of a transmission link, said transmission link comprising two pairs of wires which also feed power to said equipment from the other end of said transmission link by a D.C. voltage applied between the two pairs of wires, each transformer being individually connected to a respective one of said pairs of wires by respective first and second coupling means each comprising two identical windings serially connected between the two wires of the respective pair through a capacitor situated between the two windings, and each said transformer being connected by at least one winding to the fed equipment, wherein said remote power feeding extractor protection device comprises:

first and second rectifier bridges, said first rectifier bridge having two input terminals connected to the terminals of the capacitor of said first coupling means and said second rectifier bridge having two inputs connected to the terminals of the capacitor of said second coupling means, and said first and second rectifier bridges having their output terminals connected in parallel for supplying power to said equipment.

3. A remote power-feeding extractor protection device as defined in claim 2, wherein the rectifier bridges each comprise first and second diodes connected in series with a cathode of said first diode connected to an anode of said second diode at a first common point, third and fourth diodes connected in series with a cathode of said third diode connected to an anode of said fourth diode at a second common point, and with anodes of said first and third diodes being connected at a third common point and cathodes of said second and fourth diodes being connected at a fourth common point, with bridge inputs being taken from said first and second common points and bridge outputs being taken from said third and fourth common points.

* * * * *